US006942173B1

(12) United States Patent
Abramov (10) Patent No.: US 6,942,173 B1
(45) Date of Patent: Sep. 13, 2005

(54) CORD STORAGE DEVICE (76) Inventor: Igor Abramov, 3529 Cannon Rd., Ste 2B-602, Oceanside, CA (US) 92056

( * ) Notice: Subject to any disclaimer, the term of this patent is extended or adjusted under 35 U.S.C. 154(b) by 0 days.

(21) Appl. No.: 10/340,903

(22) Filed: Jan. 11, 2003

Related U.S. Application Data (60) Provisional application No. 60/350,547, filed on Jan. 22, 2002.

(51) Int. Cl.[7] .................... B65H 75/42; H02G 11/02
(52) U.S. Cl. .................. 242/400.1; 191/12 R; 379/441
(58) Field of Search ............................ 242/400.1, 402, 242/404; 191/12 R; 379/441, 447, 457, 446; 381/124, 374

(56) References Cited

U.S. PATENT DOCUMENTS

| 4,101,089 | A | * | 7/1978 | Culbertson et al. ...... 242/400.1 |
| 4,357,044 | A |   | 11/1982 | Woodworth |
| 4,658,465 | A | * | 4/1987 | Keane et al. ............. 191/12 R |
| 5,029,704 | A |   | 7/1991 | Stillinger |
| 5,071,367 | A |   | 12/1991 | Luu |
| 5,513,816 | A | * | 5/1996 | Grubb ..................... 242/400.1 |
| 5,727,745 | A |   | 3/1998 | Vara |
| 5,772,152 | A |   | 6/1998 | Maldonado |
| D408,719 | S |   | 4/1999 | Kovacik et al. |
| 5,924,642 | A | * | 7/1999 | Krebs et al. ............. 242/400.1 |
| 5,979,816 | A | * | 11/1999 | Blankenship et al. .... 242/400.1 |
| 5,984,224 | A | * | 11/1999 | Yang ...................... 242/400.1 |
| D422,197 | S |   | 4/2000 | Kovacik et al. |
| 6,142,405 | A |   | 11/2000 | Black |
| 6,450,436 | B1 | * | 9/2002 | Tsuji et al. .............. 242/400.1 |
| 6,484,349 | B1 | * | 11/2002 | Paterson et al. ......... 242/400.1 |
| 6,510,583 | B2 | * | 1/2003 | Griffin et al. ............ 242/400.1 |
| 6,698,560 | B2 | * | 3/2004 | Reardon et al. ......... 191/12 R |
| 2001/0007298 | A1 | * | 7/2001 | Glass ..................... 242/400.1 |
| 2002/0012440 | A1 | * | 1/2002 | Hashimoto et al. ......... 381/370 |

FOREIGN PATENT DOCUMENTS

| GB | 2261869   | * | 6/1993 |
| JP | 2-69099    | * | 2/1990 |
| JP | 2001-302104 | * | 10/2001 |

OTHER PUBLICATIONS

Picture of Radio Shack (Tandy) Product #43-2011 "Cable Management Case".

* cited by examiner

Primary Examiner—John M. Jillions (57) ABSTRACT

A device for storage of earpiece cords normally used with cellular telephones, portable radios and such. The device (8) includes an elongated base (11) with keeper tangs (10) on its top surface, each having outwardly pointing. The cord (4) is wrapped around the keeper tangs (10) and its free end is secured by two compliant tangs (12), (12a) provided for this purpose on the base (11).

The device (8) is attached to the case of the cellular phone or portable radio with an adhesive layer (13).

In alternate embodiment, the device (8a) has a pivoting keeper tang (18) which enables quick and easy release of the cord from its wound position.

Another embodiment (8b) has a hinged keeper tang (38) which also serves to quickly remove the cord.

Additional embodiment (8d) consists of two parts (52), (54) where part (52) slides into part (54) in order to adjust the overall length of the device to conform to the case of the cellular phone or portable radio.

Another embodiment (8e) consists of two independent parts (58), (60) which can be independently attached to the case of the cellular phone or portable radio.

9 Claims, 7 Drawing Sheets

CORD STORAGE DEVICE

CROSS-REFERENCE TO RELATED APPLICATION

This application claims the benefit of Provisional Patent Application Ser. No. 60/350,547, filed 2002 Jan. 22.

BACKGROUND

1. Field of Invention

This invention relates to storage of electrical cords in general and more specifically to storage of cords equipped with an earpiece and a microphone which are commonly used with cellular telephones and portable radios.

2. Prior Art

Some cellular—and portable phone and portable radio users choose to utilize an external cord equipped with an earpiece and sometimes a microphone, rather than using an earpiece and a microphone integral to a phone or a radio itself.

Unfortunately, the cords are somewhat cumbersome when not in use. The cords are by necessity up to 4 feet (1.2 meters) long and tend to tangle when not used. Some users fold them for storage, while others wrap them around a telephone itself, still others just crumple them. In either case, the subsequent use of these cords is at best slowed down, if not precluded altogether, especially when a user has to answer an incoming telephone call.

Even coiled cords, while being generally shorter than the straight cords, still are awkward to store since they resist folding more than the straight cords do.

There exist spring-loaded winding devices which store cellular phone cords in a wound position.

The disadvantages of these devices are that they are relatively bulky and heavy, close in size to the telephone itself, require a user to wear them on his or her belt close to the cellular phone, or hang the telephone from the device itself.

One such device is offered by Belkin Components of Compton, Calif. In this design a phone is hung from a cord winding device, which makes the phone to protrude significantly away from the user's body, creating a nuisance.

In contrast, the cord storage device of the present invention can be permanently or semi-permanently attached to the side of the cellular phone or it can be inserted under- and held by the protective case into which a phone can be inserted. It stays with the phone whether the phone is worn, held or put away.

None of the prior art discloses a cord storage device as disclosed and claimed herein.

SUMMARY OF THE INVENTION

In accordance with the present invention in one embodiment a cord storage device comprises a base with opposing outwardly bent keeping tangs, at least one of which may be pivotable or hinged in order to quickly and easily release the wound cord for use.

The base of the device further contains a self-adhesive layer permitting permanent or semi-permanent attachment of the device to the cellular phone or radio.

In one embodiment of the device the base of the device comprises two separate parts, each containing a keeping tang and mounted independently of each other, in order to adjust the effective length of the device to conform to a particular cellular phone length.

In another embodiment of the device the base of the device comprises two separate parts slidably engageable with each other, each containing a keeping tang, also to adjust the effective length of the device.

Another embodiment of the cord storage device has V-grooves on the underside of the base to facilitate the device's base to conform to the cellular phone or a radio housing.

OBJECTS AND ADVANTAGES

In contrast to the cord storage solutions of the prior art, the cord storage device of the present invention attaches directly to the phone or portable radio and stays with it. In addition, due to its slim design, the cord storage device adds little to the phone or portable radio width, further enhancing user comfort.

Furthermore, in several of the embodiments the base of the device contains gripping tangs which are used to secure the earpiece when the cord is wound onto the device.

Accordingly, the objective of the present invention is to provide a simple way to store earpiece and microphone cord used in cellular phones and portable radios.

Another objective of the present invention is to provide a device to store a cellular phone or a portable radio cord that is unobtrusive and not impeding operation of the phone or the radio.

Yet another objective of the present invention is to provide a device to store cellular phone or portable radio cord that is attached to the cellular phone or the radio itself and would stay with it.

Another objective of the present invention is to provide a device to store cellular phone or portable radio cord that generally conforms to the shape of the phone.

Yet another objective of the present invention is to provide a device to store cellular phone or portable radio cord that is attached to the cellular phone itself and stays with it.

Another objective of the present invention is to provide a device to store cellular phone or portable radio cord that enables a quick release of the cord.

DESCRIPTION OF THE PREFERRED EMBODIMENT

Figure 3:
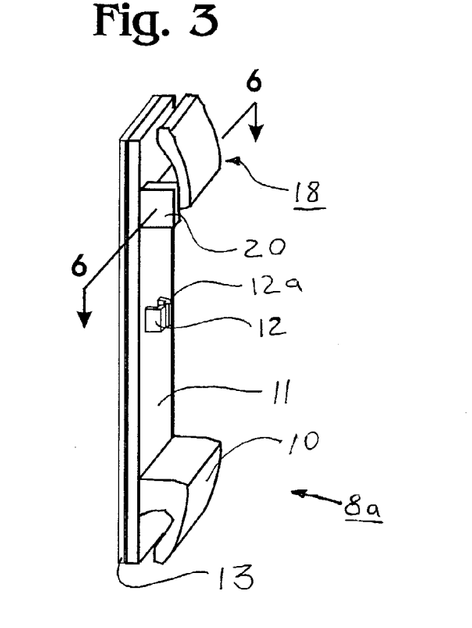
FIGS. 3, 3a show perspective views of the cord storage device with pivotable keeping tang in upright and pivoted positions respectively.
Figure 3A:
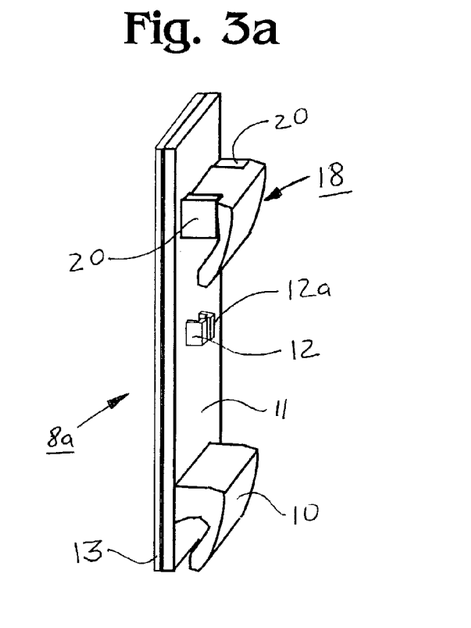
Figure 4:
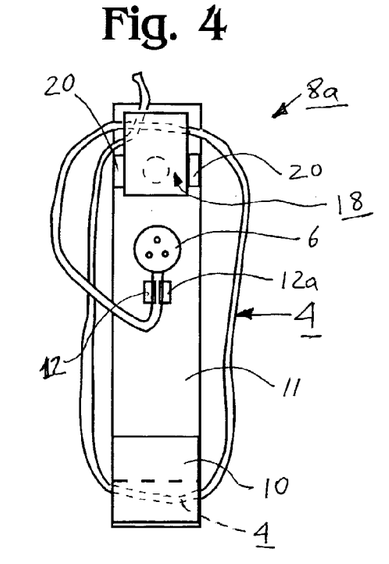
FIGS. 4, 4a show side views of the keeper with pivotable keeping tang, further illustrating the pivoting action and the subsequent release of the cord.
Figure 4A:
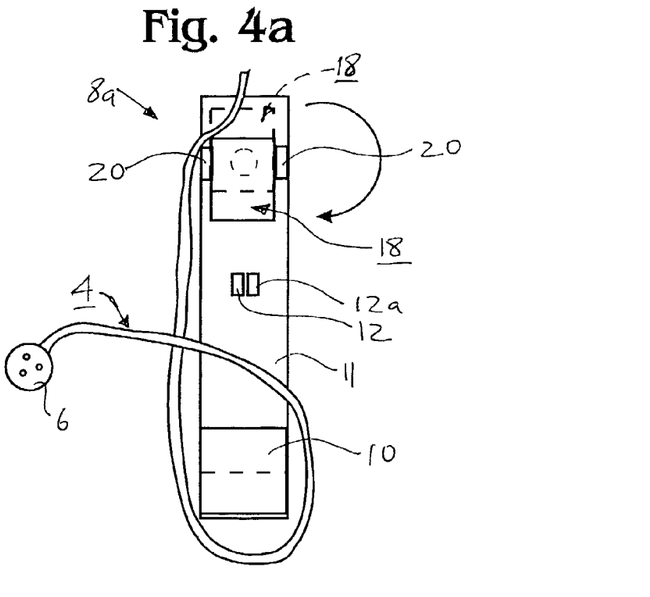

A preferred embodiment of the present invention is illustrated on FIGS. 3 and 3a, (perspective views), and FIGS. 4 and 4a (plan views). Cord storage device 8a consists of elongated base 11 having keeper tang 10 on one distal end and pivotable keeper tang 18 on the other distal end. Base 11 further contains two opposing compliant tangs 12 and 12a for holding an earpiece. Tangs 12 and 12a are located approximately in the middle of base 11. Base 11 further contains pressure-sensitive adhesive strip 13 to facilitate attachment of the cord storage device to a telephone or a radio.

Figure 5:
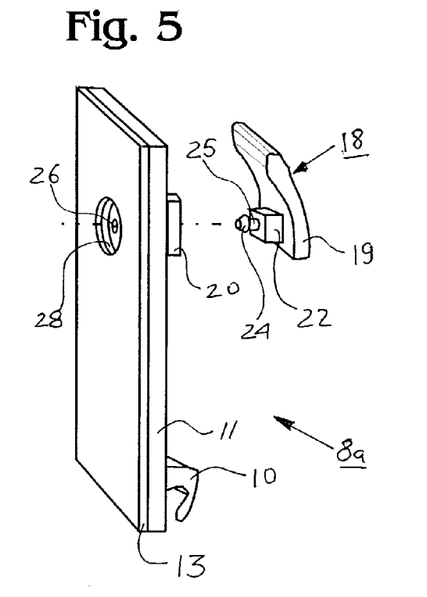
FIG. 5 shows exploded perspective view of the cord storage device assembly with pivotable keeping tang.

As shown on FIG. 5 pivotable keeper tang 18 consists of body 19, pedestal 22, integral pivot shaft 25 and locking head 24.

Keeper tang 18 is pivotally secured in the base 11 by locking tang 24 passing through the opening 26 in base 11. Opening 26 is constructed to be slightly larger than pivot shaft 25 diameter and simultaneously slightly smaller than the largest diameter of locking head 24 in order to pivotally capture pivot shaft and with it the rest of keeper tang 18.

Figure 6:
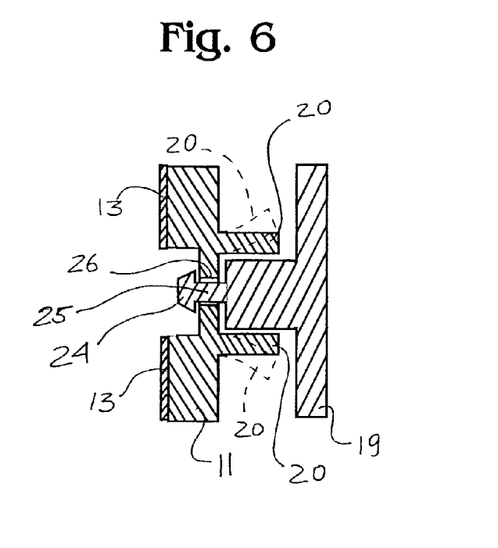
FIG. 6 shows a magnified cross section view of the cord storage device taken along line 6—6 on FIG. 3.

An essentially circular countersink 28 is made sufficiently deep so that locking tang 24 does not protrude out of the plane of base 11. As illustrated on FIG. 6 compliant restrictors 20 situated on base 11 opposably engage the generally rectangular pedestal 22 of keeper tang 18 to ensure that keeper tang is effectively restricted to only two pivoted positions, namely, 1) the cord keeping position with the keeper body 19 pivoted outward, and 2) the cord release position with keeper body 19 pivoted inward. These positions are illustrated on FIGS. 3, 3a, 4 and 4a. It should be noted that compliant restrictors 20 can be positioned at 90 degrees to their illustrated position, without the loss of their function. This position may deem to be advantageous for the ease of manufacture of the device.

ADDITIONAL EMBODIMENTS

In the foregoing description like components are labeled with like numerals.

Figure 1:
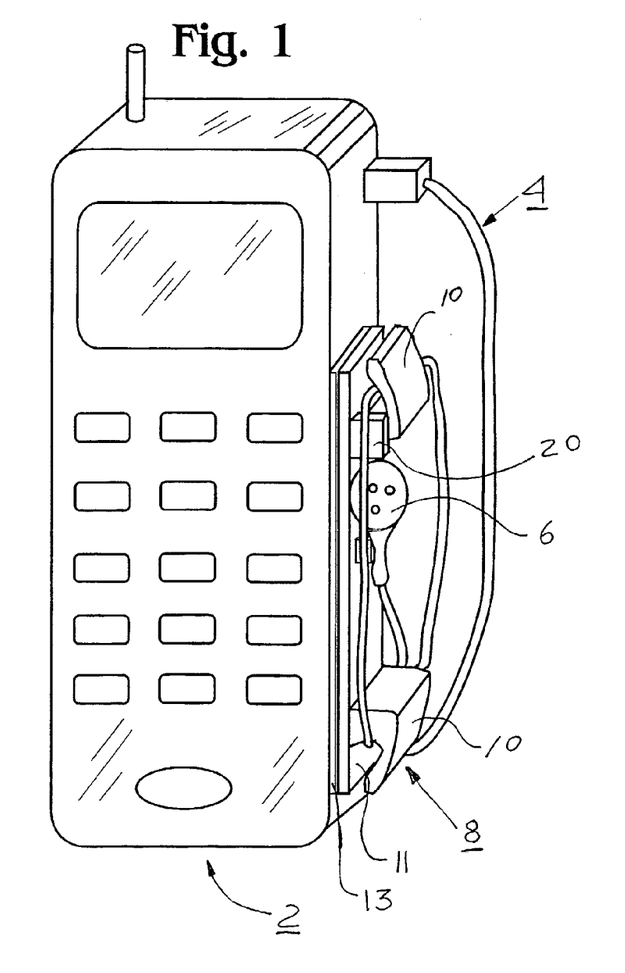
FIG. 1 shows a perspective of the cord storage device attached onto a cellular phone with a cord wrapped onto the device and an earpiece held in the base of the device.

Referring to FIG. 1, cord storage device 8 is adhesively attached to cellular phone 2 by layer of adhesive 13. As further shown on FIGS. 1 and 4 in its stored position cord assembly 4 is wound onto keeper tang 10 and pivotable keeper tang 18, with earpiece 6 secured to base 11 by opposing compliant tangs 12 and 12a.

As shown on FIG. 4a, to release the cord, pivotable keeper tang 18 is rotated into release position and cord assembly 4 is effectively released. Earpiece 6 then can be removed from tangs 12 and 12a for use.

Figure 7:
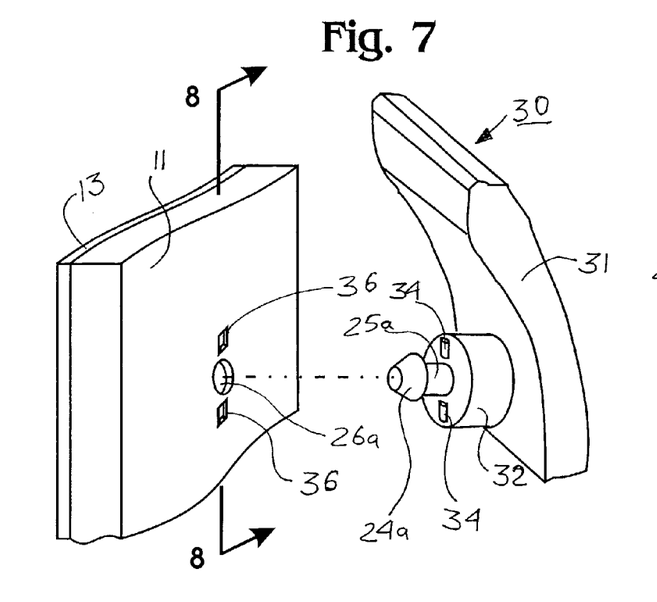
FIG. 7 is a fragmentary magnified exploded view of a variation of the pivotable keeping tang and base.
Figure 8:
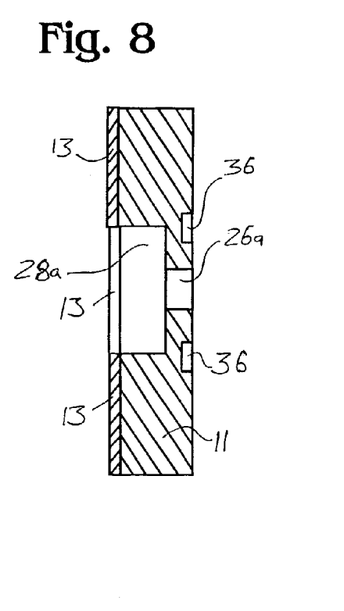
FIG. 8 is a cross sectional view taken along line 8—8 on FIG. 7.

FIG. 7 shows a variation 30 of the pivotable keeper tang. Keeper tang body 31 contains pedestal 32 which is terminated in pivot shaft 25a and locking head 24a. Additionally, pedestal 32 contains projections 34 which engage detents 36 on base 11 when keeper tang is inserted and locked in base 11 by inserting locking tang 24a through opening 26a. It should be noted that the projections and detents are interchangeable between base 11 and pedestal 32, that is, base 11 may have projections on it, while pedestal 32 may contain corresponding detents.

Figure 2:
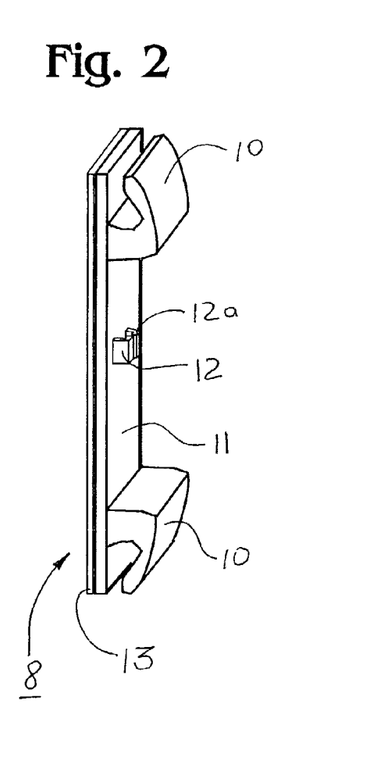
FIG. 2 shows a perspective of simplified one-piece cord storage device with the cord's earpiece held by the keeping tangs on the base of the device.
Figure 2A:
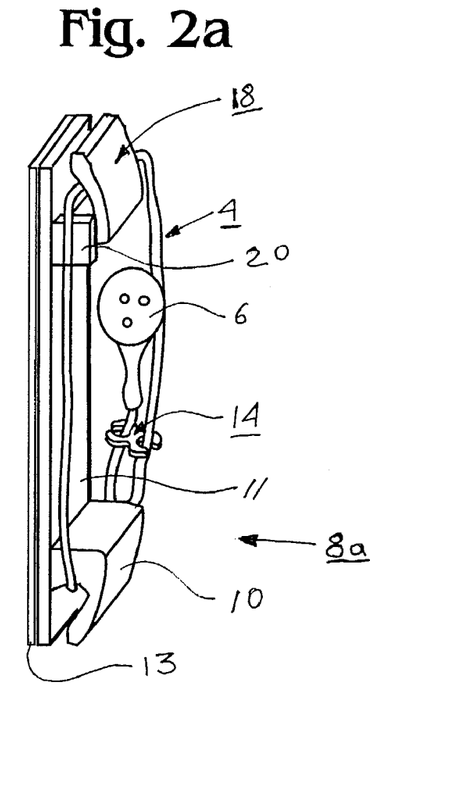
FIG. 2a shows a perspective of simplified one-piece cord storage device with the cord's earpiece and the free end held by the clasp.
Figure 2B:
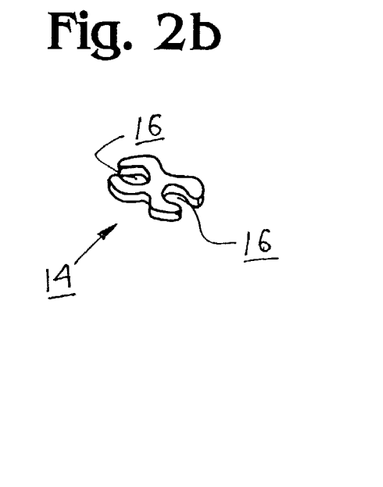
FIG. 2b shows a perspective of the clasp for keeping the free end of the cord

A variation of the cord storage device 8a is shown on FIG. 2a. Cord assembly 4 is wrapped around keeper tang 10 and pivotable keeper tang 18. Earpiece 6 is held in place by clasp 14 instead of locking tangs 12 and 12a of prior embodiments. As shown on FIG. 2b clasp 14 contains openings 16 to accommodate the cord. Clasp 14 is preferably made of a compliant material, such as polyethylene or similar in order to permit repeated capturing and release of the cord.

Figure 12:
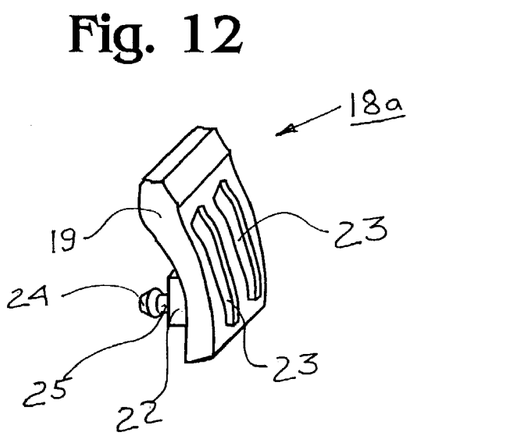
FIG. 12 is a variation of a pivotable keeping tang having a finger catch to facilitate its release.

A modified pivotable keeper tang 18a on FIG. 12 contains ridges 23 on body 19 to help a user to grasp and pivot the tang.

Figure 9:
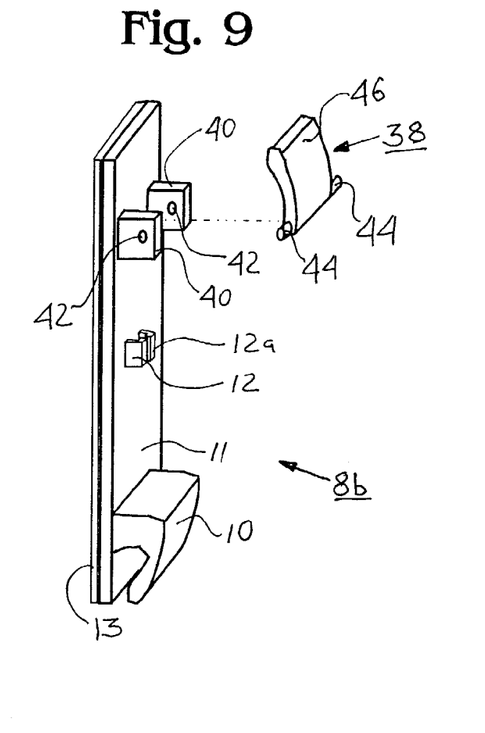
FIG. 9 is an exploded prospective view of a cord storage device with a hinged keeping tang
Figure 10:
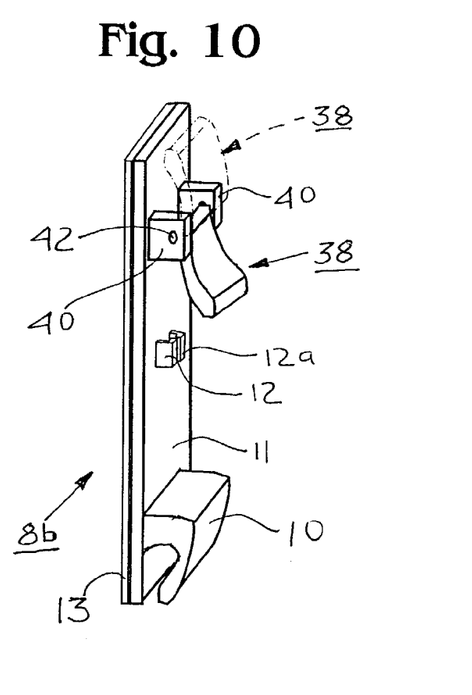
FIG. 10 is a perspective view of a cord storage device with a hinged keeping tang showing the movement of the tang from cord keeping position to the release position.

Another embodiment of cord storage device denoted 8b is shown on FIGS. 9 and 10. One of the keeper tangs is made hinged to release the cord. As shown on FIG. 10, hinged keeper tang 38 swings inward thereby releasing the cord. Hinged keeper tang 38 consists of body 46 with opposing pivot pins 44. Pivot pins 44 rotatably fit in corresponding openings 42 located in pedestals 40 on base 11. Pivot pins 44 are made preferably oval in cross-section, so when they engage openings 42 which are also preferably made elongated, hinged keeper tang 38 is retained preferentially in the outward and the inward positions to facilitate secure holding of the wound cord and provide ease of use of the cord, respectively.

Figure 9A:
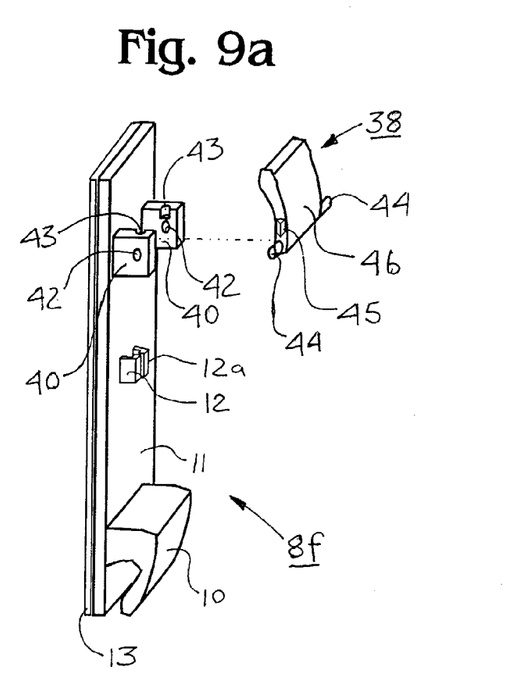
FIG. 9a is an exploded prospective view of a cord storage device with a hinged keeping tang with lateral projections.
Figure 11:
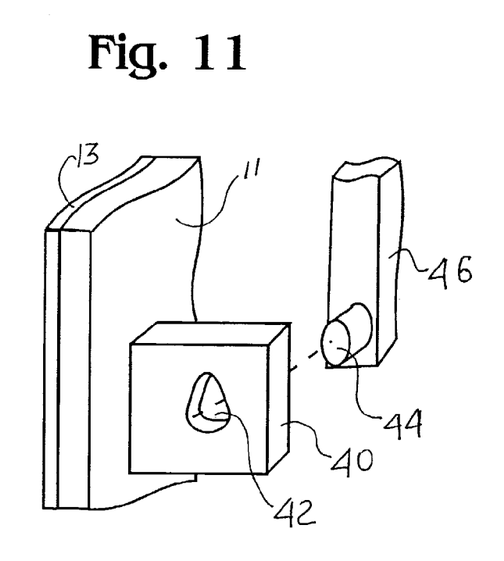
FIG. 11 shows a fragmentary exploded perspective view of the hinged keeping tang and support
Figure 11A:
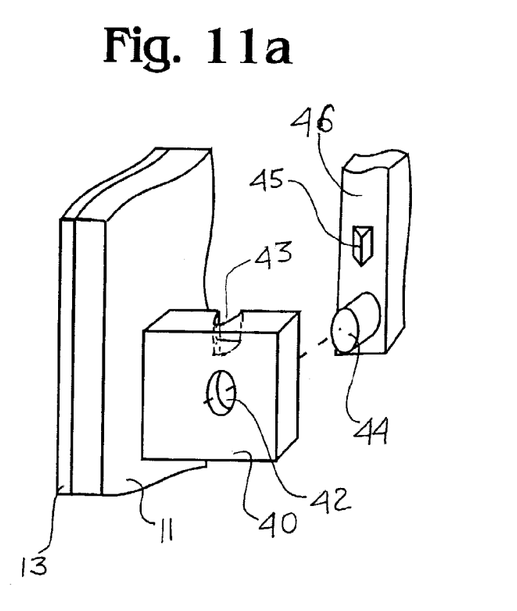
FIG. 11a is an exploded perspective view of a cord storage device with a hinged keeping tang with lateral projections.

Yet another embodiment of cord storage device denoted 8f with hinged keeper tang 38 is shown on FIG. 9a and FIG. 11a. Hinged keeper tang 38 is similar to the one of the previous embodiment with the addition of projections 45 located on both lateral edges of body 46 which engage corresponding detents 43 on pedestals 40. Pedestals 40 are made compliant as to permit release of the hinged keeper tang 38 from the locked outward position.

Figure 13:
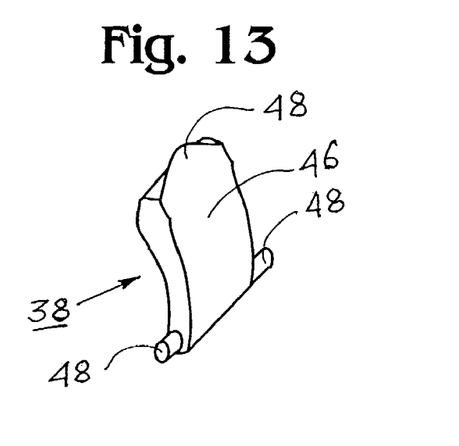
FIG. 13 is a variation of a hinged keeping tang with a finger catch to facilitate its release.

A modified hinged keeper tang 38a on FIG. 13 contains finger catch 48 on body 46 to facilitate the ease of use. Another embodiment of cord storage device 8 is shown on FIG. 2. In this embodiment both keeper tangs 10 are made stationary to simplify construction and lower the cost of the device.

Figure 14:
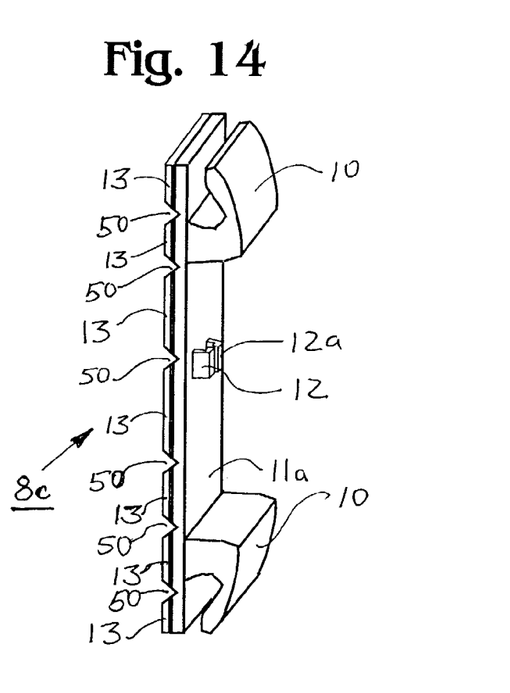
FIG. 14 is a perspective view of a cord storage device with V-grooves on underside of its base.

FIG. 14 shows further cord storage device modification 8c, where V-grooves 50 are provided on the underside of base 11a to facilitate conformance of cord storage device to the curves of cellular phone or a portable radio case.

Figure 15:
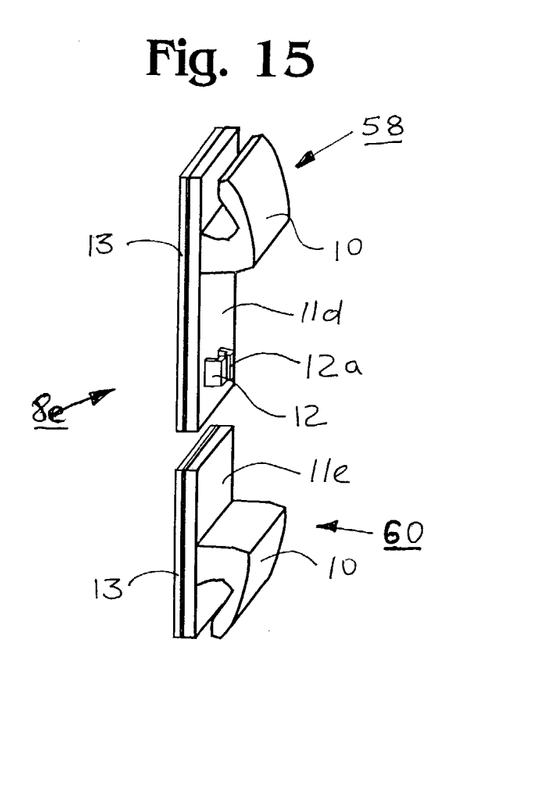
FIG. 15 is a perspective view of a two-part cord storage device
Figure 16:
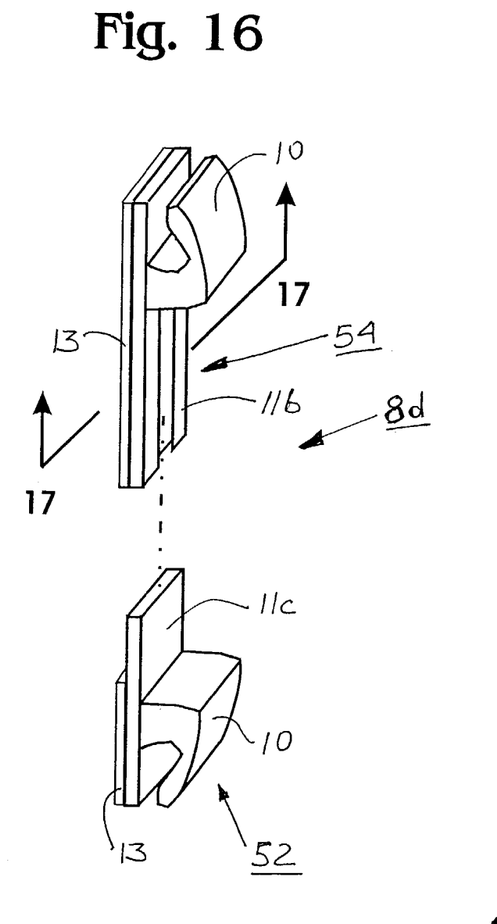
FIG. 16 is an exploded perspective view of a two-part cord storage device with sliding parts.
Figure 17:
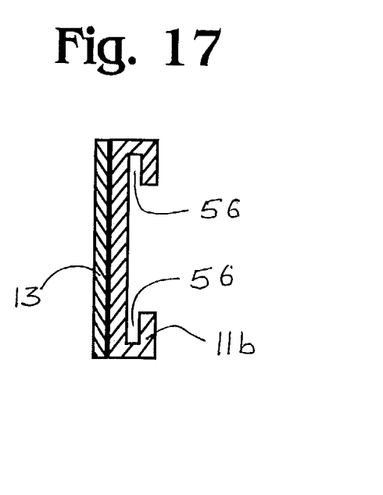
FIG. 17 is a cross sectional view taken along line 17—17 on FIG. 16

FIGS. 15 through 17 show cord storage device embodiments consisting of two separate parts, in order to adapt to cellular phone or portable radio cases of different lengths. Embodiment 8d shown on FIGS. 16 and 17 consists of two parts, 52 and 54. Base 11b of the upper keeper 54 contains open channel 56 made sufficiently large to slidably accommodate in it base 11c of lower keeper 52.

Conversely, as shown in embodiment 8e on FIG. 15, the keeper can be made of two independent sections 58 and 60 each consisting of base 11d and 11e respectively.

It should be noted that although in these embodiments keeper tangs 10 are shown of the fixed type, they can be replaced by the pivoting or hinged varieties described earlier.

Although descriptions provided above contain many specific details, they should not be construed as limiting the scope of the present invention. For example, many projections, detents and retainers can be interchanged and combined without the loss of function, as should be readily apparent to those skilled in the art.

Also, although the use of the device was described as pertaining to cellular phones and portable radios, it can also be used with cordless phones and in other applications and devices where a portable cord storage is desired. The device can also be used to store non-electrical cords, such as fishing line or thread.

Thus, the scope of this invention should be determined from the appended claims and their legal equivalents.

What is claimed is:

1. An earpiece cord storage device for portable telephone or radio comprising an essentially elongated base,
    said base comprising at least one winding support means,
    a cord end retaining means to releasably retain at least one free end of said cord,
    whereby at least one of said winding support means further comprising winding release means,
    said winding release means enabling the release of said cord from said winding support means without unwinding,
    said base further comprising attachment means for attachment to portable telephone or radio,
    whereby said cord is releasably wrapped around said winding support means.

2. The cord storage device of claim 1, wherein said base is capable of essentially conforming to the shape of the portable telephone or radio attached thereto.

3. The cord storage device of claim 1, wherein said base is capable of essentially conforming to the size of the portable telephone or radio attached thereto.

4. The cord storage device of claim 1, wherein said base comprises a single element.

5. The cord storage device of claim 1, wherein said base comprises a plurality of elements.

6. The cord storage device of claim 1, wherein said cord end retaining means is located on said base.

7. The cord storage device of claim 1, wherein said cord end retaining means comprises a separate element.

8. The cord storage device of claim 7, wherein said cord end retaining means is capable of releasably securing two or more adjacent sections of said cord to each other.

9. A method of releasably storing an earpiece cord on a portable telephone or radio comprising the steps of:
    a) providing a support base,
    b) on said support base providing attachment means,
    c) on said support base further providing at least one winding support means which will:
        1) while in winding storage condition, support said cord in wound state, and
        2) while in winding release condition, release said cord,
    d) providing cord end retaining means for at least one free end of said cord,
    e) attaching said support base to a portable telephone or radio,
    f) placing said winding support means into winding storage condition,
    g) wrapping said cord onto said winding support means,
    h) releasably securing at least one free end of said cord in said cord end retaining means;
whereby said cord is thusly securely stored, and
whereby release of said cord is accomplished without unwinding by
    a) placing said winding support means into winding release condition,
    b) slipping said cord off of said winding support means without unwinding it,
    c) causing at least one free end of said cord to be released from said cord end retaining means.

* * * * *